United States Patent
Margolis

(10) Patent No.: US 12,321,036 B1
(45) Date of Patent: Jun. 3, 2025

(54) COMPLEX FOCUSING SYSTEM WITH MODULATING LENSES

(71) Applicant: H. Jay Margolis, Centennial, CO (US)

(72) Inventor: H. Jay Margolis, Centennial, CO (US)

( * ) Notice: Subject to any disclaimer, the term of this patent is extended or adjusted under 35 U.S.C. 154(b) by 603 days.

(21) Appl. No.: 17/670,219

(22) Filed: Feb. 11, 2022

Related U.S. Application Data

(63) Continuation-in-part of application No. 16/560,900, filed on Sep. 4, 2019, now Pat. No. 11,269,156.

(60) Provisional application No. 62/732,900, filed on Sep. 18, 2018, provisional application No. 62/727,306, filed on Sep. 5, 2018.

(51) Int. Cl.
| | |
|---|---|
| *G02B 7/10* | (2021.01) |
| *G02B 9/04* | (2006.01) |
| *G02B 13/00* | (2006.01) |
| *G02B 21/02* | (2006.01) |
| *G02B 26/08* | (2006.01) |
| *G02F 1/29* | (2006.01) |

(52) U.S. Cl.
CPC ............... *G02B 7/10* (2013.01); *G02B 9/04* (2013.01); *G02B 26/0875* (2013.01); *G02F 1/29* (2013.01); *G02B 13/001* (2013.01); *G02B 21/025* (2013.01)

(58) Field of Classification Search
CPC ........ G02B 7/10; G02B 9/04; G02B 26/0875; G02B 13/001; G02B 21/025; G02B 15/10; G02B 15/12; G02B 3/14; G02B 26/004; G02B 26/005; G02F 1/29; G02F 1/294
USPC .......................................................... 359/673
See application file for complete search history.

(56) References Cited

U.S. PATENT DOCUMENTS

| | | | |
|---|---|---|---|
| 2,937,570 A | 5/1960 | Hillman | |
| 3,023,673 A | 3/1962 | Cox et al. | |
| 3,030,863 A | 4/1962 | Schwartz et al. | |
| 3,174,396 A | 3/1965 | Ruben | |
| 3,471,218 A | 10/1969 | Benford et al. | |
| 3,476,462 A | 11/1969 | Benford | |
| 3,481,665 A | 12/1969 | Rosenberger | |
| 3,497,290 A | 2/1970 | Rosenberger | |
| 3,507,554 A | 4/1970 | Benford | |

(Continued)

FOREIGN PATENT DOCUMENTS

| | | | |
|---|---|---|---|
| FR | 2572545 | | 5/1986 |
| JP | 2006098972 A | * | 4/2006 |

(Continued)

OTHER PUBLICATIONS

Gross et al. "Handbook of Optical Systems Volume 3: Aberration Theory and Correction of Optical Systems" Weinheim Germany, Wiley-VCH Verlag GmbH & Co. KGaA, pp. 377-379 (Year: 2007).*

(Continued)

*Primary Examiner* — Pinping Sun
*Assistant Examiner* — Andrew R Wright
(74) *Attorney, Agent, or Firm* — LEYDIG, VOIT & MAYER, LTD.

(57) ABSTRACT

The present invention relates to optical imaging systems which are able to provide increased depth of field to microscope devices, motion-picture cameras, and still photographic cameras, while also reducing or elimination breathing while the focus of the device is adjusted. Optical systems described herein are also able to be used with standard film and digital sensor formats, and are able to be attached to, or integrated with, photographic and motion-picture cameras, including currently existing cameras.

20 Claims, 7 Drawing Sheets

(56) References Cited

U.S. PATENT DOCUMENTS

| | | | |
|---|---|---|---|
| 3,514,189 A | | 5/1970 | Aklin |
| 3,515,463 A | | 6/1970 | Rosenberger |
| 4,015,895 A | | 4/1977 | Hirose |
| 4,318,585 A | | 3/1982 | Matsumura |
| 4,641,928 A | | 2/1987 | Hamanishi |
| 4,988,173 A | | 1/1991 | Margolis |
| 5,054,896 A | | 10/1991 | Margolis |
| 5,452,133 A | | 9/1995 | Margolis |
| 6,094,314 A | * | 7/2000 | Tanaka .............. G02B 27/0037 359/689 |
| 6,366,398 B1 | | 4/2002 | Ouchi |
| 6,661,583 B2 | | 12/2003 | Shinohara |
| 6,760,154 B1 | | 7/2004 | Focht |
| 7,471,458 B2 | | 12/2008 | Straehle et al. |
| 7,554,723 B2 | | 6/2009 | Moeller et al. |
| 7,869,139 B2 | | 1/2011 | Margolis |
| 7,880,978 B2 | | 2/2011 | Neil |
| 8,282,004 B2 | | 10/2012 | Wang et al. |
| 8,379,329 B2 | | 2/2013 | Nakayama et al. |
| 9,164,266 B2 | | 1/2015 | Margolis |
| 9,116,101 B2 | | 8/2015 | Chen et al. |
| 10,670,844 B2 | * | 6/2020 | Byler .................. G02B 21/361 |
| 10,935,753 B1 | | 3/2021 | Margolis |
| 11,269,156 B1 | | 3/2022 | Margolis |
| 2005/0200967 A1 | | 9/2005 | Yamasaki et al. |
| 2007/0273980 A1 | | 11/2007 | Horiuchi |
| 2008/0074765 A1 | * | 3/2008 | Hayakawa ............... G02B 7/08 359/819 |
| 2010/0110568 A1 | | 5/2010 | Margolis |
| 2010/0157104 A1 | * | 6/2010 | Nagaoka ........ G02B 15/145129 348/E5.055 |
| 2010/0328782 A1 | | 12/2010 | Suzuki et al. |
| 2011/0069381 A1 | | 3/2011 | Redford |
| 2011/0292520 A1 | * | 12/2011 | Wada ................ G02B 15/1461 359/683 |
| 2012/0194730 A1 | * | 8/2012 | Morooka ....... G02B 15/145121 359/683 |
| 2012/0314299 A1 | * | 12/2012 | Tashiro ................ G02B 13/009 359/683 |
| 2014/0340500 A1 | | 11/2014 | Hoegele |
| 2017/0068075 A1 | * | 3/2017 | Onozaki ............ G02B 27/0025 |
| 2017/0068134 A1 | * | 3/2017 | Yadin ........................ G02F 1/29 |
| 2017/0242227 A1 | * | 8/2017 | Kitada .................... G02B 15/22 |
| 2017/0336593 A1 | * | 11/2017 | Takada ...................... G02B 9/60 |
| 2017/0363864 A1 | | 12/2017 | Margolis |
| 2018/0275390 A1 | * | 9/2018 | Harsila ................. G02B 21/245 |

FOREIGN PATENT DOCUMENTS

| | | |
|---|---|---|
| WO | WO 2010/096461 | 8/2010 |
| WO | WO 2016/089674 | 6/2016 |

OTHER PUBLICATIONS

International Preliminary Report on Patentability from International Application No. PCT/US2010/024446, mailed Sep. 1, 2011, 6 pages.
International Preliminary Report on Patentability from International Application No. PCT/US2015/062405, mailed Jun. 15, 2017, 12 pages.
International Search Report from International Application No. PCT/US2010/024446, mailed Apr. 16, 2010, 7 pages.
International Search Report from International Application No. PCT/US2015/062405, mailed Mar. 2, 2016, 13 pages.
Kam et al. (1997) "Three-Dimensional Microscopy in Thick Biological Samples: a Fresh Approach for Adjusting Focus and Correcting Spherical Aberration," Bioimaging 5:40-49.
US Office Action, dated Jan. 15, 2015, in U.S. Appl. No. 13/202,522, 6 pp.
US Notice of Allowance, dated Jul. 14, 2015, in U.S. Appl. No. 13/202,522, 7 pp.
US Office Action, dated Nov. 23, 2018, in U.S. Appl. No. 15/532,858, 5 pp.
US Office Action, dated Apr. 26, 2019, in U.S. Appl. No. 15/532,858, 17 pp.
US Office Action, dated Apr. 2, 2020, in U.S. Appl. No. 16/058,903, 7 pp.
Zieler (1995) "Tricks and Treats in Photomicrography", Microscopy Today, 3(6): 16-20.
U.S. Appl. No. 08/101,544, filed Aug. 2, 1993.
U.S. Appl. No. 11/847,600, filed Aug. 30, 2007.
U.S. Appl. No. 12/605,554, filed Oct. 26, 2009.
U.S. Appl. No. 12/908,555, filed Oct. 20, 2010.
U.S. Appl. No. 13/202,522, filed Aug. 19, 2011.
U.S. Appl. No. 14/011,675, filed Aug. 27, 2013.
U.S. Appl. No. 14/612,108, filed Feb. 2, 2015.
U.S. Appl. No. 15/532,858, filed Jun. 2, 2017.
U.S. Appl. No. 16/058,903, filed Aug. 8, 2018.
U.S. Appl. No. 17/162,591, filed Jan. 29, 2021.
U.S. Appl. No. 16/560,900, filed Sep. 4, 2019.

* cited by examiner

COMPLEX FOCUSING SYSTEM WITH MODULATING LENSES

CROSS REFERENCE TO RELATED APPLICATIONS

This application is continuation-in-part of U.S. patent application Ser. No. 16/560,900, filed Sep. 4, 2019, and claims priority from U.S. Provisional Patent Application No. 62/727,306, filed Sep. 5, 2018, and U.S. Provisional Patent Application No. 62/732,900, filed Sep. 18, 2019, all of which are incorporated by reference herein to the extent that there is no inconsistency with the present disclosure.

BACKGROUND OF THE INVENTION

The present invention generally relates to optical imaging systems suitable for use with cameras, particularly still and motion-picture cameras, microscopes, and imaging lenses, and are able to provide focus without introducing noticeable magnification changes during translation. The presently described optical imaging systems are also able to provide increased depth of field.

"Focus breathing", also referred to as "breathing" and "lens breathing", refers to a change in focal length, angle of view, and/or magnification when changing the focus of a lens system. For example, the size of an image may become bigger or smaller as the focus is adjusted. Breathing is especially problematic in video photography, where changing focus between different objects or between the background and foreground may cause the field of view to appear as if the camera is zooming in or out during the adjustment of the focus.

Breathing is also problematic in focus stacking, where multiple pictures are taken of the same object at slightly different focus distances. The images are then combined to produce a final composite image having more of the object in sharp focus than any single individual picture. However, if the size or angle of view of the image changes each time the focus is adjusted, then it will be more difficult to combine the images to provide a final clear image.

A variety of factors affect breathing, but the most considerable is the change in the focal length of an optic with focus at different strata or working distances. The present invention balances such factors to greatly reduce or functionally eliminate breathing. The novel construction of the focusing device herein described also lends itself to construction of optics with great depth of field.

Depth of field generally refers to the distance between the closest and furthest points in an image that are in acceptable focus. Thus, a greater depth of field generally means that more of the image will be in focus, while a smaller depth of field generally means that less of the image will be in focus.

A variety of factors can affect depth of field. For example, decreasing the camera aperture (thereby decreasing the light let into the camera) and increasing the time of exposure will typically increase the depth of field and will result in more of the image being in focus. In contrast, increasing the camera aperture (thereby letting in more light) will typically result in lower depth of field and less of the image being in focus. Additionally, the smaller an object and the closer the camera is positioned to the object will also typically decrease the depth of field. For example, in microscopy the objects can be bacteria, insects, and other small objects placed very close to the microscope or camera. Thus, the depth of field for these images is extremely small.

Scientific and commercial photographers will often go to extreme lengths, such as increasing the exposure time to a minute or more, to obtain greater depth of field so as to have multiple features of the object in focus. However, this type of long exposure requires very sensitive equipment, little to no vibration, and high light levels.

Optical systems which generally provide focus from near distance to infinity are currently available. For example, devices such as endoscopes, borescopes and the like incorporate a front objective relayed to a rear optical system and are well known in the art. However, such systems have restricted apertures, limited field coverage and significant distortion making them completely unsuited for use with high quality, large-sensor cameras and recording devices such as those used for motion picture and scientific photography and imaging. In particular, conventional optical systems which are designed to provide greater depth of field result in much narrower field coverage (i.e., field of view). Accordingly, the produced image may result in vignetting, be unsuitable for standard camera sensor sizes or film sizes, or may not capture the full object or picture desired by the photographer. As a result, multiple images will often have to be digitally combined to produce the full desired image similar to the process used in focus stacking. Some conventional optical systems attempt to correct the above defects by using relays or other types of optical fixes behind the objective lens; however, such systems greatly increase the size of the device (making such a device impractical), provide insufficient depth of field, degrade the image quality, or do not address the breathing issue.

The continuously-focusable microscope (U.S. Pat. No. 5,054,896 to Margolis) incorporates a relay based on the unique characteristics of afocal variation as a focusing means that can be focused to infinity. However, its imagery at a far distance is uncorrected and generally inadequate. Some additional optical systems have been developed on similar principles that are relatively long and cumbersome and also do not provide imagery similar in quality as provided by the present invention.

Thus, what is needed is an imaging device which provides decreased breathing and increased depth of field with little to no distortion, and also provides a wide field of view in a relatively compact configuration that covers common formats used in technical and motion picture photography.

SUMMARY OF THE INVENTION

In view of the foregoing, the present invention provides optical imaging systems which incorporate a novel set of optical lens systems and spatial relationships that reduces or functionally eliminates breathing during adjustment of the focus of the system. Additionally, aspects of the present invention provide the ability to maintain focus from near distance to infinity (i.e., provides a high depth of field) with a high degree of imaging quality.

As described herein, the present invention limits or eliminates breathing (i.e., permits adjustment of focus with little to no change in magnification or the angle of view), is able to be used with standard film and digital sensor formats, and is able to be attached to, or integrated with, photographic and motion-picture cameras, including currently existing cameras. The present invention further maintains suitable field coverage allowing larger objects or wider scenes to be photographed while also remaining compatible with high imaging quality camera formats and sensor sizes.

In an aspect of the invention, a multiple focusing device is provided wherein two focusing systems in optical series are used in conjunction to allow all the provided capabilities of each focusing system. However, each focusing system is able to operate independently of the other.

In an embodiment the present invention utilizes a series of optical and spatial relationships which stem from a unique formula for the positioning and incorporation of the optics in the focuser systems. By utilizing a constructive formula, a front primary focuser (or "primary focusing system") facilitates focus from a variety of optical objective systems and devices, while a secondary focuser (or "secondary focusing system") functions so that once the primary focuser establishes an image, the secondary focuser translates focus onto, above or below the primary focuser-established focus with virtually little or no breathing. In derivation, the primary focuser can be used with a multitude of potential objective systems for general imaging or high depth of field imaging.

In accordance with typical convention, the secondary focusing system is illustrated and described herein as being behind (to the right) or above the primary focusing system, meaning that light rays from an object to be imaged will pass through the primary focusing system before reaching the secondary focusing system.

In an embodiment, the present invention provides an optical system comprising:
a) an optical housing able to hold one or more optical lens systems, the optical housing having a front end able to receive light from an object and a back end able to be attached to a camera, sensor, further imaging system, or microscope device;
b) a primary focusing system positioned within the optical housing, the primary focusing system comprising a first positive lens system and a first negative lens system, wherein the first positive lens system comprises a modulated lens system, or a moveable lens system able to be moved toward and away from the first negative lens system; and
c) a secondary focusing system positioned behind the primary focusing system within the optical housing, the secondary focusing system comprising a second positive lens system, a second negative lens system, and a third positive lens system.

The first positive lens system is any positive lens system known in the art able to form a functional focusing system when positioned in front of the first negative lens system. Likewise, the first negative lens system is any negative lens system known in the art able to form a functional focusing system when combined with the first positive lens system. Similarly, the second positive lens system, second negative lens system, and third positive lens system are any lens systems able to form a functional focusing system when positioned in optical series as described herein.

In an embodiment, the primary focusing system is located atop (or behind) an imaging lens component and incorporates a variable or fixed aperture constant with the microscopical understanding of the contrast and resolution setting sometimes commonly known as the Nelson Condition, Nelson three-quarter cone, or Nelson Point (even in some literature known as the "OOMPH" position) wherein the performance of the entire system is maximized, possibly and expectantly to or approximately to the diffraction limit (see, for example, Zieler and McCrone, 1995, "Tricks and Treats in Photomicrography", Microscopy Today, 3 (6): 16-20).

Preferably, the primary focusing system is made more or less insensitive to dust being imaged simultaneously by setting the focusing relationship to any and all suitable front objective or lens systems to infinity and then adjusting until at that setting, dust or contaminants are not simultaneously imaged. By dint of this, dust or other contaminants will not be simultaneously imaged at any other focal settings for other operative working distances.

This primary focusing system can be made as a simplified system by its imaging lens component being a single lens, a complex lens, an aspheric lens or a microscope objective as known in the art. The imaging lens component can be mounted singly or may be exchanged for other imaging lens components such that different focal lengths can be alternatively positioned by art known means. The imaging lens may also be either specific or variable, either solid or deformable, and if deformable, able to be activated when deformed. Additionally, by choosing specific performance characteristics, the imaging lens can be made to incorporate deliberate errors or enhancements to obtain either highest image quality or what may be considered to be artistic impressions, such as bokeh effects (the aesthetic blur produced in the out-of-focus parts of an image), petzval effects (swirly or twisted blurring in the background of an image), intentional patterns inserted into the image, or background blurring similar in to portrait modes in digital cameras.

The control of the aperture to obtain the Nelson Condition (or deliberately depart from it) can incorporate fixed open aperture designs or patterns that can affect the bokeh effects. These designs or patterns can be mounted in fixed, swing-in, rotatable or other manual or motorized positioning means, such that one or more bokeh patterns can be selected by the user. Thus, it is noted that the primary focusing system provides to the secondary system which can be positioned above it, many possibilities and alternatives for image provision, control and characteristics.

The first positive lens system and second negative lens system are, independently from one another, modulated lens systems, moveable lens systems, or combinations thereof, in that the entire lens systems, or at least one or more lens elements in the lens systems, are able to be modulated, moved forward and backward within the optical housing, or both so as to provide focus to a formed image. In an embodiment, the first positive lens system and/or the second negative lens system comprise an electrically tunable lens system having a light focusing medium, where applying an electric field or electric signal alters the refractive index of the light focusing medium. In an embodiment, the first positive lens system and/or the second negative lens system comprise one or more deformable lens elements which are able to change focal length when the lens element is deformed. In an embodiment, the first positive lens system and/or the second negative lens system are moveable lens systems. Optionally, the first positive lens system and/or the second negative lens system are able to be moved toward and away from the first negative lens system using a vibrationally controlled actuator or a voice coil actuator.

The second positive lens system is positioned behind the first negative lens system at a distance that is between 65% to 85% of the first negative lens system focal length, preferably at a distance that is between 70% to 80% of the first negative lens system focal length, preferably at a distance that is between 72.5% to 77.5% of the first negative lens system focal length, or preferably at a distance that is approximately 75% of the first negative lens system focal length.

The optical combination of the first negative lens system and the second positive lens system results in a combined focal length that is between 20% and 30% greater than the first negative lens system focal length, preferably between 22% and 28% greater than the first negative lens system focal length, or preferably approximately 25% greater than the first negative lens system focal length.

Optionally, the second negative lens system comprises two or more lens systems. Whether a single lens or a combination of lenses, the second negative lens system has a second focal length that is between 190% to 210% of the combined focal length of the first negative lens system and the second positive lens system, preferably between 195% to 205% of the combined focal length, or preferably approximately 200% of the combined focal length.

The third positive lens system has a third focal length that is between 590% to 610% of the combined focal length of the first negative lens system and the second positive lens system, preferably between 595% to 605% of the combined focal length, or preferably approximately 600% of the combined focal length.

In an embodiment, the present invention provides an optical system comprising:
 a) an optical housing able to hold one or more optical lens systems, the optical housing having a front end able to receive light from an object and a back end able to be attached to a camera, sensor, further imaging system, or microscope device;
 b) a primary focusing system positioned within the optical housing, the primary focusing system comprising a first positive lens system having a focal length of 50 mm (±10%, preferably ±5%) and a first negative lens system having a focal length of −20 mm (±10%, preferably ±5%), wherein the first positive lens system comprises a modulated lens system, or a moveable lens system able to be moved toward and away from the first negative lens system;
 c) a secondary focusing system positioned behind the primary focusing system within the optical housing, the secondary focusing system comprising a second positive lens system having a focal length of 175 mm (±10%, preferably ±5%), a second negative lens system having a focal length of −50 mm (±10%, preferably ±5%), and a third positive lens system having a focal length of 150 mm (±10%, preferably ±5%),
 wherein the second positive lens system is positioned 15 mm (±10%, preferably ±5%) behind the first negative lens system, and the optical combination of the first negative lens system and the second positive lens system results in a combined focal length of 25 mm (±10%, preferably ±5%).

Thus, in an embodiment, the present invention provides a set of focusers which, used either singly, together of successively, infuse an optical system with the ability to obtain various desired techniques within the present understanding of optical usages. For example, the present invention facilitates the construction of high depth of field imagers, microscopical and telescopic means for aberrational correction and imagery of all other sorts.

Preferably, the optical systems describe herein are able to reduce or eliminate breathing and provide good depth of field while maintaining a wide field of view. For example, in embodiments, the optical system provides an angular of view of 40° or more, preferably of 50° or more, or preferably 60° or more. In embodiments, the magnification or angle of view changes by less than 10%, preferably less than 5%, preferably less than 1%, or preferably less than 0.5% during adjustment of the focus of the image.

Preferably, the optical systems of the present invention are attached to or integrated with still photography cameras, motion picture cameras, or cellular phone cameras. In embodiments of the invention, the optical system is used with motion picture and photographic cameras, including, but not limited to, 23 mm, 24 mm, 35 mm, 70 mm, and 8×10 inch camera formats, and digital cameras and other devices having sensor sizes including, but not limited to, 36 mm×24 mm, APS-H 27.9 mm×18.6 mm, APS-C 23.6 mm×15.6 mm, 22.2 mm×14.8 mm, 18.7 mm×1 mm, and MFT ⁴⁄₃ inches, and one inch (12.8 mm×9.6 mm).

In an embodiment, the present invention provides a method of obtaining an image comprising the steps of: providing any of the optical systems as describe herein and focusing the optical system on a desired object or area to generate the image.

Software can further be utilized to track the point spread of a particular detail as movement defocuses it. Consequently, the real time capture of images can be such that even if moved, the impression becomes one where a subject can progressively be held in focus with no noticeable magnification differences.

BRIEF DESCRIPTION OF THE DRAWINGS

The accompanying drawings illustrate or describe various aspects and embodiments of the present invention.

DETAILED DESCRIPTION OF THE INVENTION

Definitions

Figure 1:
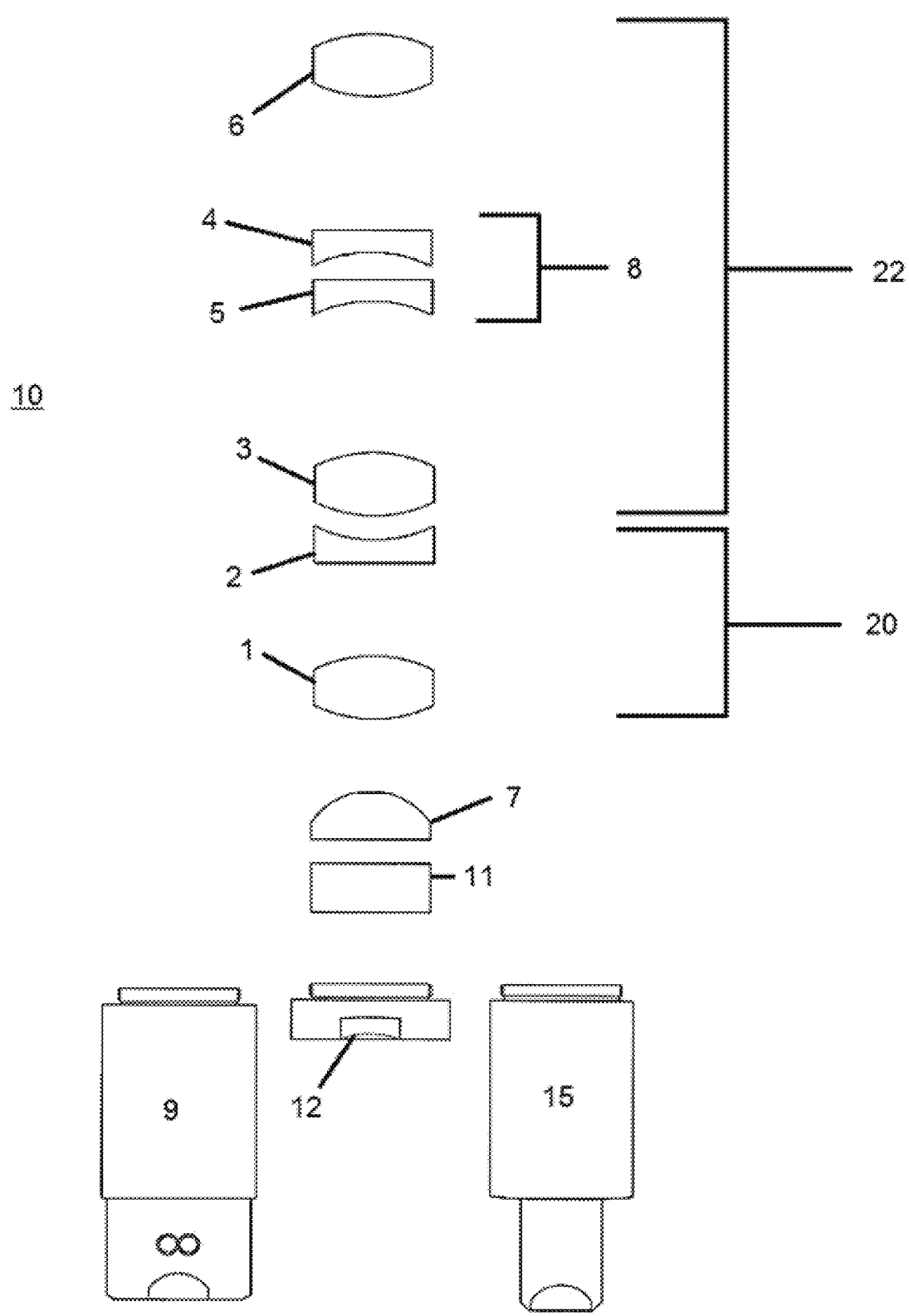
FIG. 1 illustrates an optical imaging system in an embodiment of the present invention able to be used with microscope objective sets as well as a macro configuration.

The terms and definitions contained herein are used according to their normal definitions as understood in the art. The following definitions are provided to add further clarification to the terms.

As used herein, "breathing", "focus breathing", and "lens breathing" are used synonymously with one another and refer to a change in focal length, angle of view, and/or magnification as the result of changing the focus of a lens system.

"Angle of view" refers to the angular extent of a given subject or scene that is imaged by a camera. In conventional optical systems, changing the focal length will typically change the angle of view. A shorter focal length will typically result in a wider angle of view and a greater area captured of by the camera. A longer focal length will typically result in a smaller angle of view and will result in the subject appearing larger.

"Depth of field" refers to the distance between the closest and furthest points in an image that are in acceptable focus. Although a lens can precisely focus at only one distance at a time, the decrease in sharpness is gradual on each side of the focused distance, so that within the depth of field, the lack of sharpness is imperceptible under normal viewing conditions.

"Field of view" refers to the part of an object or scene that is projected onto the camera sensor or film by an optical system. For example, objects outside the field of view when the picture is taken are not recorded in the photograph. It is often expressed as the angular size of the view cone as "angular field of view".

As used herein, the term "lens system" can refer to a single lens or lens element, or to multiple lenses and lens elements, such as doublets or triplets, as known in the art. For example, the lens systems described herein can each comprise a single lens or multiple lenses, such as doublets or triplets, as known in the art. In a further embodiment, the microscopes, cameras and devices used with the optical imaging device further comprises one or more additional optical components, including but not limited to eye pieces, sensors, cameras, corrective lens systems, beam splitters, polarizers, prisms, illuminators and combinations thereof, to modify and produce the final image or images. The additional optical components may be used in conjunction with the objective lens system, or placed along the optical path.

"Focal length" is the distance between the center of a lens or optical system and its focal point. "Focal plane" refers to the imaginary line perpendicular to the optical axis which passes through a lens's or optical system's focal point.

"Spherical aberration" is the lens aberration resulting from the increased refraction of light rays passing through or near the edge of the lens compared to light rays passing through or near the center of the lens. Light rays across different regions of the lens are focused at different points resulting in an imaging having increased blur.

"Chromatic aberration" is the lens aberration resulting from the normal increase in refractive index of all common materials toward the blue end of the spectrum. The change in image size from one color to another is known at lateral chromatic difference of magnification.

As used herein, "infinity focus", "set to infinity" or being able to form a "focus to infinity" is the state where a lens or other optical system is able to form an image of an object an infinite distance away. Infinity focus places the plane of focus at a sufficiently far distance that light from than plane reaching the lens are essentially parallel.

As used herein, the "Nelson condition", "Nelson three-quarter cone", or "Nelson point" refers to the aperture opening of a system at a point where there is a noticeable jump in contrast in the image.

As used herein, a "modulated lens system" is a lens system able to be modulated so as to alter the focal length of the lens system without having to mechanically change the position (i.e., distance from a front objective or imaging lens) of the lens system within the device. Modulated lens systems may be modulated such as by altering the refractive index of the lens system, or by deforming the shape (surface curvature) of the lens system, where altering the refractive index and/or deforming the shape of the lens system will change the focal length of the lens system. Modulated lens systems include, but are not limited to, electrically tunable lens systems and deformable lens systems. Electrically tunable lens systems typically have a light focusing medium, such as a fluid or gel, where the refractive index of the light focusing medium is altered by applying an electric field or electric signal to the medium.

Overview

The present invention provides a complex focusing system to which frontal objectives of various kinds can be focused and/or relayed to a final focus. In an aspect of the invention, the system incorporates a front primary focusing system and a rear secondary focusing system, where the front primary focusing system produces an initial focus. The rear secondary focusing system then provides an extremely fine translation of the initial focus without significant or any change in magnification of the presented initial focus, thus countering the magnification changing phenomenon known as "breathing."

The primary focusing system can accept, by proper adaptive means known in the art, virtually any kind of objective type known that can be spaced or attached to form a performable device, limited only by suitability to do so. Optionally, the secondary focusing system shares its initial component with the rear of the primary focusing system. Thus, the two focusing systems can be separated at the shared component, above the shared component, or below the shared component, provided either focusing system contains the shared component. The invention thus permits imaging of various front objectives by an initial focus which can then be fine focused without significant or any breathing.

EXAMPLE 1

FIG. 1 illustrates an exemplary optical system 10 having a first positive lens system 1 and a first negative lens system 2 arranged in optical series with another, where the first positive lens system 1 is able to be modulated or moved towards or away from the first negative lens system 2 so as to provide focus. As such, lens systems 1 and 2 are able to be configured to form a primary focusing system 20 capable of focus beyond infinity, to infinity, or closer than infinity. When lens systems 1 and 2 are placed above an infinity-corrected microscope objective, for example, they act to focus an image from the objective onto an image plane.

When lens systems 1 and 2 are supplemented by a further lens or lens combination (imaging lens systems 7 and 12), a focusable magnifier results. When imaging lens system 12 is replaced by a microscope objective set (9 or 15) so that the primary image is focused upon by imaging lens 7 and refined to a final focus by first positive lens system 1 and first negative lens system 2, the system will form a continuously-focusable microscope. Since this combination also can be focused to infinity, it is possible to use this configuration for high depth of field photo/cinematography even to the extent of forced perspective. Additional lens systems, such as an aspherical or achromatic lens system 11, can be added to provide spherical or chromatic aberration correction.

The first negative lens system 2 is additionally positioned at a distance c. (circa) 75% of its otherwise negative focal length from a second positive lens system 3. As a result, the combined negative effect increases by c.25% so that lens systems 2 and 3 now equal an approximately 25% greater negative lens combination than just the first negative lens system 2 by itself.

The optical system 10 further comprises a second negative lens system 8 and a third positive lens system 6 arranged in optical series with another. The second negative lens system 8 comprises a single lens element or, alternatively, multiple lens elements (shown in the figures as lenses 4 and 5). The second negative lens system 8, as a single lens element or combined lens system, has a focal length (expressed negatively) approximately two times the negative focal length of the combination of lens systems 2 and 3. The third positive lens system 6 has a focal length (expressed positively) approximately six times the negative focal length of the combination of lens systems 2 and 3. Taken together, lens systems 3, 8 and 6 are able to be configured to form a secondary focusing system 22.

The second negative lens system 8, or lens elements within the second negative lens system 8, are similarly able to be modulated or moved towards or away from the first negative lens system 2. As a result, the optical system 10 as a whole can be summarily adjusted so that modulation or movement of the second negative lens system 8 (such as movement of lenses 4 and 5) will further focus the primary focusing system 20 (first positive lens system 1 and a first negative lens system 2) such that a back focal distance conjugate can be utilized that in itself is adjusted for a standard distance to sensor or intermediary image plane. Little if any breathing of the system is experienced during a focal translation of a pre-selected plane from a first positive lens system 1 and a first negative lens system 2.

It is understood that the modulation and/or movement of any lens systems (or one or more lens elements thereof), such the first positive lens system 1 or the second negative lens system 8, can be achieved by any suitable means known in the art. In an embodiment, movement of the lens systems is achieved using a vibrationally controlled actuator or voice coil actuator. In an embodiment, the movement or modulation of one or more lens systems is rapidly performed at a sustained rate, so that the focused image is retained when the invention is used as an observational or recording system. Thus, when so moved or modulated, the invention becomes useful to observe objects with an apparently high degree of depth of field. Such a system could be used, for example, to keep objects in apparent depth of field during medical or metrological examinations.

Additionally, by monitoring the contrast, focus and other characteristics of the image as provided by the present invention, almost seamless follow-focus may be obtained if the reciprocal is set that maintains progressive sharp focus. This may be facilitated by computational or other means known in the art. For example, a camera incorporating the present invention can be moved in to take a close-up image of an object while keeping focus through the translation and without changing magnification. The present invention particularly allows for focus pulling in micro, macro and modeling applications.

Furthermore, if lens systems 2 and 3 are separable at the spacing between them, the primary focusing system 20 and secondary focusing system 22 can be independent modules which can be assembled to function in or out of the totality. If lens systems 2 and 3 are assembled permanently together or made as a single common lens system, the primary and secondary focusing systems can be a unitized and integrated assembly intended to be considered and used as a single entity.

The lenses used herein include, but are not limited to, achromatic lenses and planoconvex lenses. As illustrated in the present figures, the first negative lens system is shown as having the flat side of the lens facing the front of the optical system while the curved side of the lens faces the rear of the system. However, it is understood that this configuration may be flipped so that the curved side of the negative lens faces the front of the system. Likewise, the lenses of the second negative lens system may be oriented so that either the flat side or the curved side of each lens faces the front of the system. The first and second negative lens systems may also be oriented so that the flat sides of the lenses face the same direction or intentionally face different directions.

EXAMPLE 2

Figure 2:
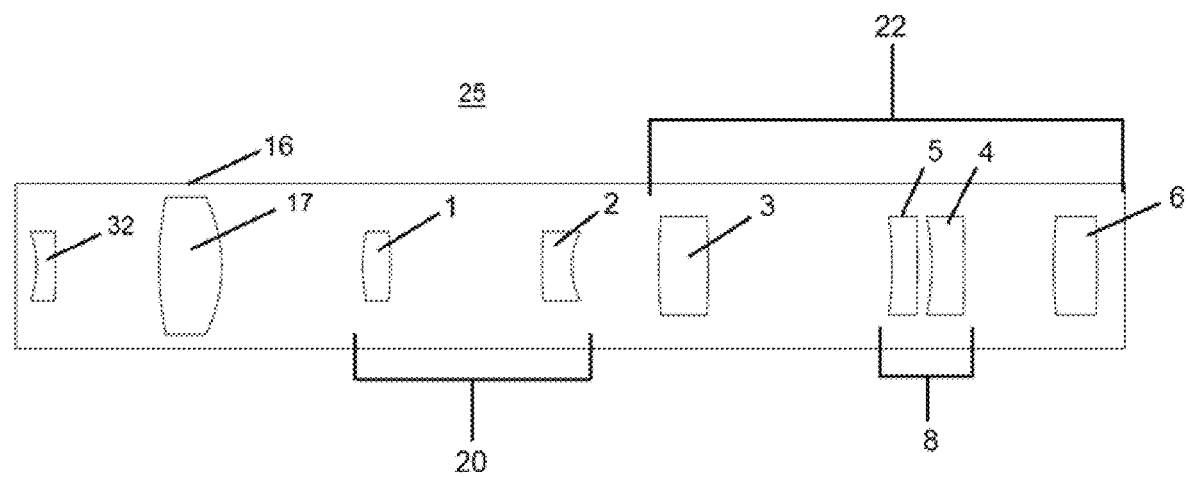
FIGS. 2 and 3 illustrate an optical imaging system in an embodiment of the present invention as part of a macro imaging configuration. Exemplary dimensions between various elements are shown in FIG. 3.

FIG. 2 shows a similar optical system 25 arranged as part of a macro imaging configuration with supplemental lens systems 17 and 32. A first positive lens system 1 is positioned within a housing 16 and is able to be modulated or moved towards or away from a first negative lens system 2. The first positive lens system 1 is originally positioned so that an object from infinity will form a focused image at a suitable back conjugate position, which is an intermediary aerial image, or presented to a surface that is a sensor or electro-magnetic sensitive material.

First negative lens system 2 is then the rear-most component of a primary focusing system 25. A second positive lens system 3 is the first element of a secondary focusing system 22. It is positioned c.75% of the focal length of the first negative lens system 2 from the first negative lens system 2. The focal length of the second positive lens system 3 is such that the combination of lens systems 2 and 3 is approximately 25% greater than the first negative lens system 2 by itself.

A second negative lens system 8 (shown as a combination of negative lens systems 4 and 5) is positioned behind the second positive lens system 3 and has twice the focal length of the combination of lens systems 2 and 3. The second negative lens system 8 is similarly modulated or movable and, in an embodiment, is originally positioned c.66% of its focal length from the second positive lens system 3 (expressed as distance x and x/2 from a third positive lens system 6 that has a focal length c. 6 times the focal length of combined lenses 2 and 3).

The space between the first negative lens system 2 and the second positive lens system 3 is a point where the primary focusing system 25 and secondary focusing system 22 can be separated as individual components. The primary focusing system 20 can then be used by itself.

Figure 3:
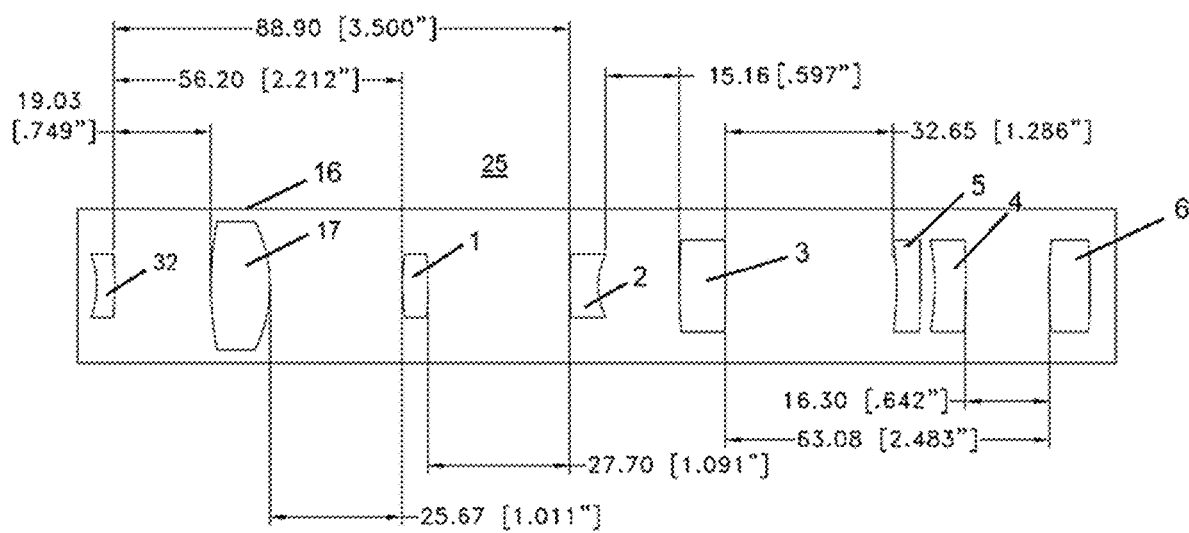

FIG. 3 shows an optical system 25 as described in FIG. 2 but with exemplary dimensions of the device and distanced between each lens system. In an embodiment, the components of the optical system function to provide a rear focal conjugate of c.58 mm. This is the general industry standard for 35 mm SLRs and cine cameras but it can be adjusted for other rear conjugates.

In an embodiment illustrated by FIG. 3, first positive lens system 1 is a positive 50 mm lens; first negative lens system 2 is a negative lens having a −20 mm focal length; second positive lens system 3 is positive lens of 175 mm; second negative lens system 8 (the combination of lenses 4 and 5) is a negative lens of −50 mm; and third positive lens system 6 is a positive lens of 150 mm.

It should be understood that the focal lengths noted above are rounded. Nevertheless, the exemplary embodiment can be thusly constructed whereby, upon the primary focusing system establishing a focus, the secondary focusing system can be used to sweep that established focus with the unique characteristic that no significant or essential magnification changes ("breathing") occur.

EXAMPLE 3

Figure 4:
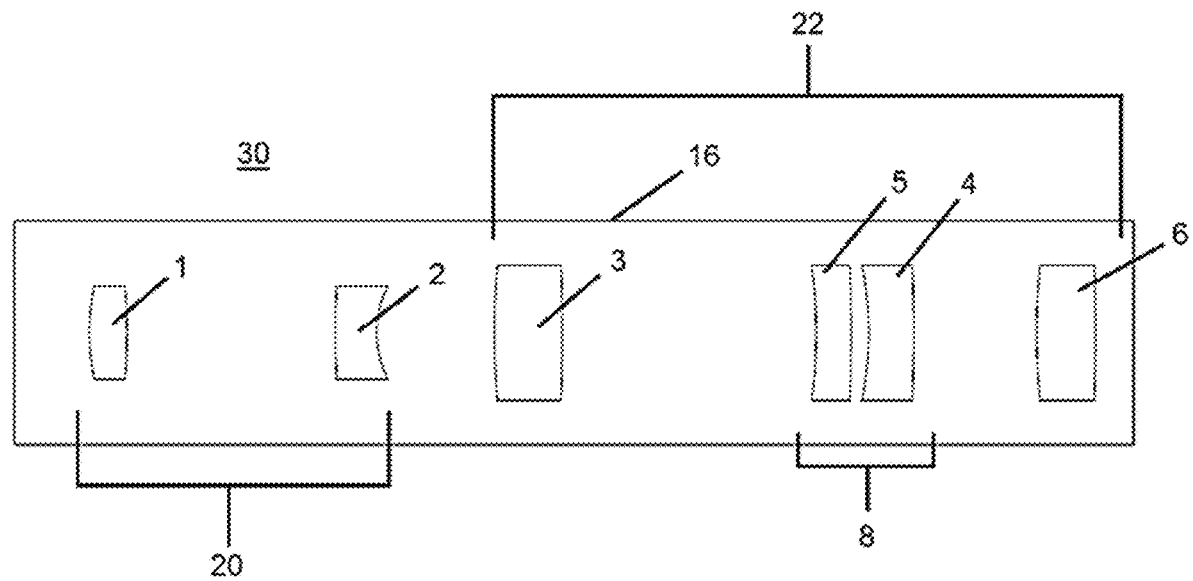
FIGS. 4 and 5 illustrate a simplified optical imaging system in an embodiment of the present invention containing just the primary and secondary focusing systems. Exemplary dimensions between various elements are shown in FIG. 5.
Figure 5:
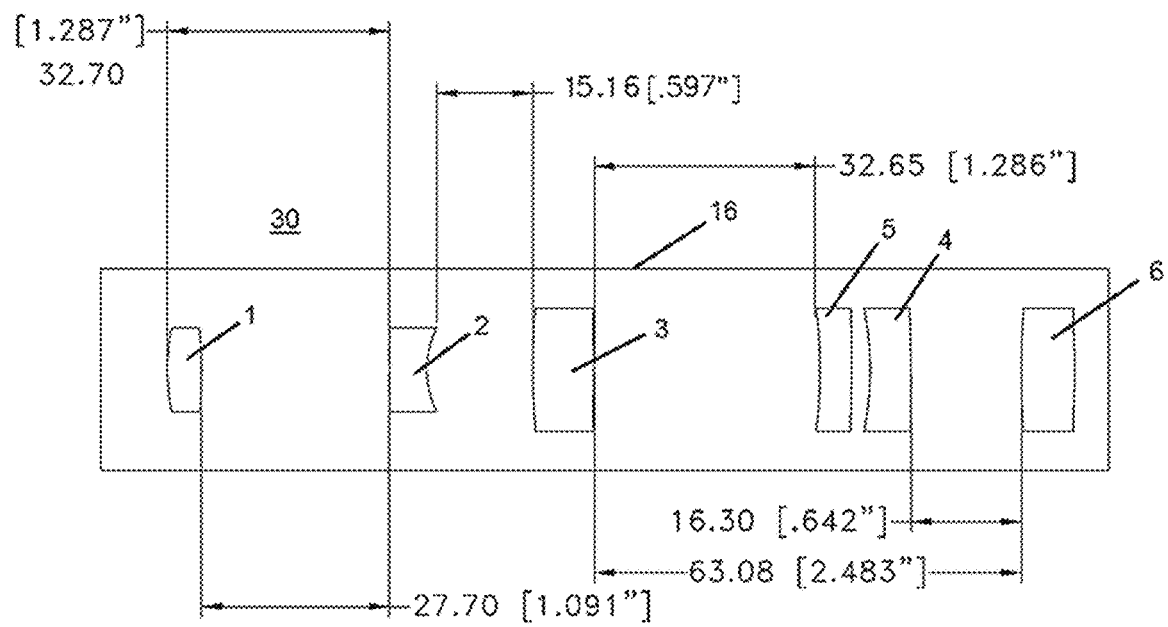

FIGS. 4 and 5 show similar optical systems 30 as illustrated in FIGS. 2 and 3 but with only the primary and secondary focusing systems and without any additional objectives sets or supplemental lenses. As described above, one or more lens systems may be modulated or moveable. For example, first positive lens system 1 is able to be moved toward and away from the first negative lens system 2, or may be a deformable lens system. The second negative lens system 8 is also modulated or moveable, such as through the modulation or movement of lenses 4 and/or 5. Accordingly, the distances provided in these figures may change during operation of the optical system; however, the distance between the first negative lens system 2 and second positive lens system 3 will remain at approximately 75% (±10%, preferably ±5%) of the focal length of the first negative lens system 2.

In an exemplary embodiment, the focal lengths of the lens systems described above are as follows:
first positive lens system 1 has a focal length of 50 mm,
first negative lens system 2 has a negative focal length of −20 mm,
second positive lens system 3 has a focal length of 175 mm,
negative lenses 4 and 5 both have a focal length of −100 mm (which results in
negative lens system 8 having a net focal length of −50 mm), and
third positive lens system 6 has a focal length of 150 mm.

A separation between the first negative lens system 2 and the second positive lens system 3 permits a separation of the optical device 30 into a primary focusing system 20 and a secondary focusing system 22. The distance between the first negative lens system 2 and the second positive lens system 3 of this separation is c.75% of the focal length of the first negative element 2.

Thus, the total focal length of the first negative lens system 2 (i.e., approximately-20 mm) when used in conjunction with the second positive lens system 3 is c.25% greater than the first negative lens system 2 alone. Thus, at 75% separation and 25% greater focal length, known optical calculations predict that a positive 175 mm focal length for the second positive lens system 3 meets the necessary conditions. Then, the second negative lens system 8 has a total focal length resulting in c. −50 mm focal length in order to be twice the focal length of the combination of lens systems 2 and 3 (c. −25 mm).

Put another way, the optical system 30 has a combined −25 mm lens set which has a central space where it can be separated into a −20 mm lens system and a 175 mm positive lens system (the space between being c.75% of first negative lens system focal length=c. 15 mm). The resulting focal length of the combination of lens systems 2 and 3 is approximately 25% greater than the original focal length of first negative lens system (−20 mm).

A second negative lens 8 having a total focal length of −50 mm is twice the focal length of the combination of lens systems 2 and 3. This is positioned as previously described between a third positive lens system 6 which has a focal length approximately six time the focal length of the −25 mm combination.

Thus, in certain aspects described above, the present invention utilizes unique spatial and optical relationships to provide simple and compact optical imaging systems and devices, which are able to provide increased depth of field to microscope devices, motion-picture cameras, still photographic cameras, and other devices.

Figure 6:
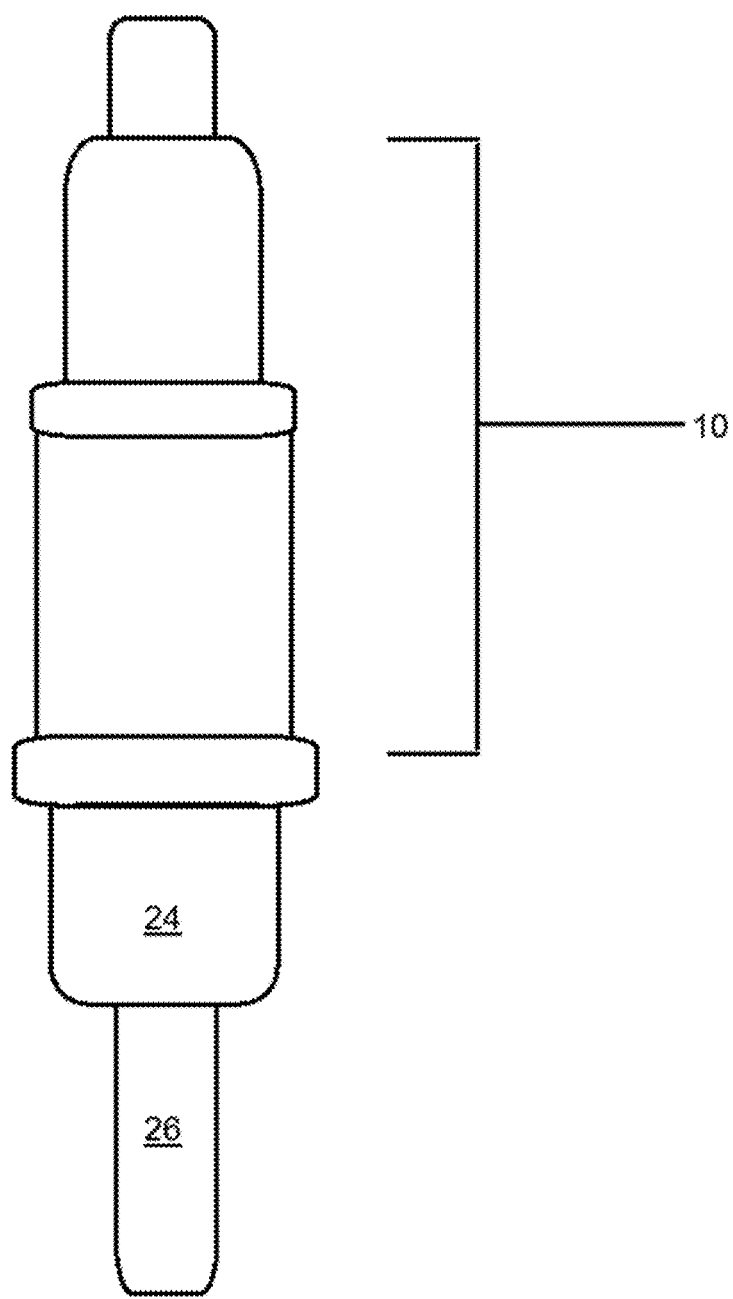
FIG. 6 shows an optical imaging system in an embodiment of the present invention integrated with a pre-existing optical device.

The optical imaging systems of the present inventions are also beneficial in that they are small, compact, and can be easily attached to currently existing still photography cameras, movie cameras, and video cameras. FIG. 6 shows an optical imaging system 10 in an embodiment of the present invention integrated with a pre-existing optical imaging device 24 having its own objective 26.

Figure 7:
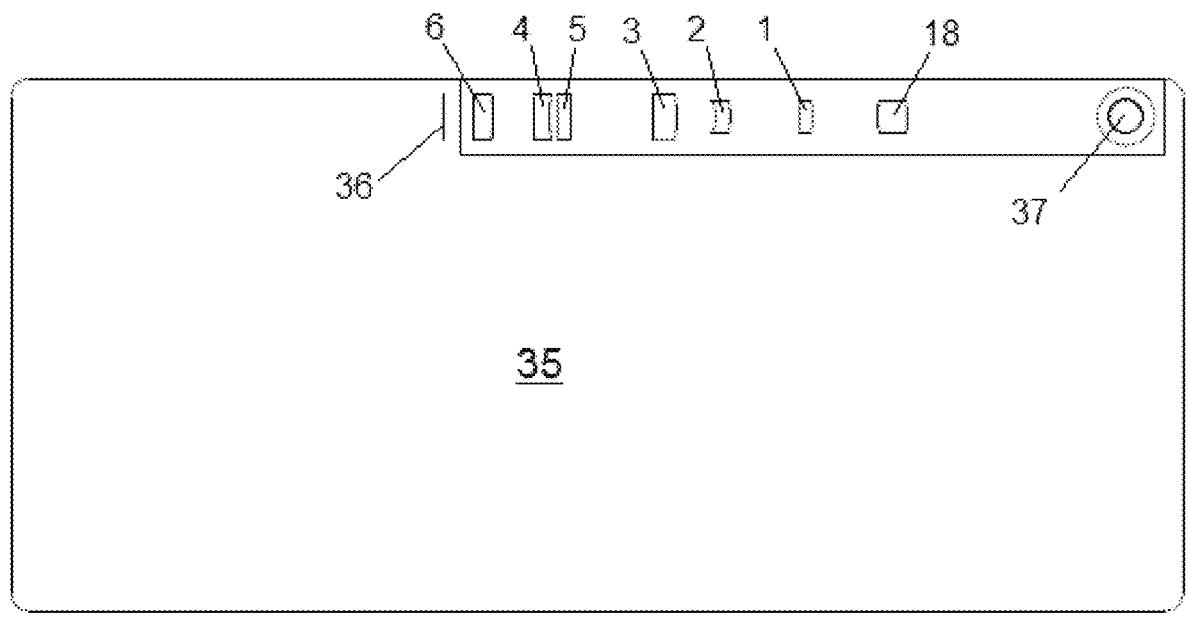
FIG. 7 illustrates an optical imaging system in an embodiment of the present invention able to be used as part of a cellular phone camera.
Figure 8:
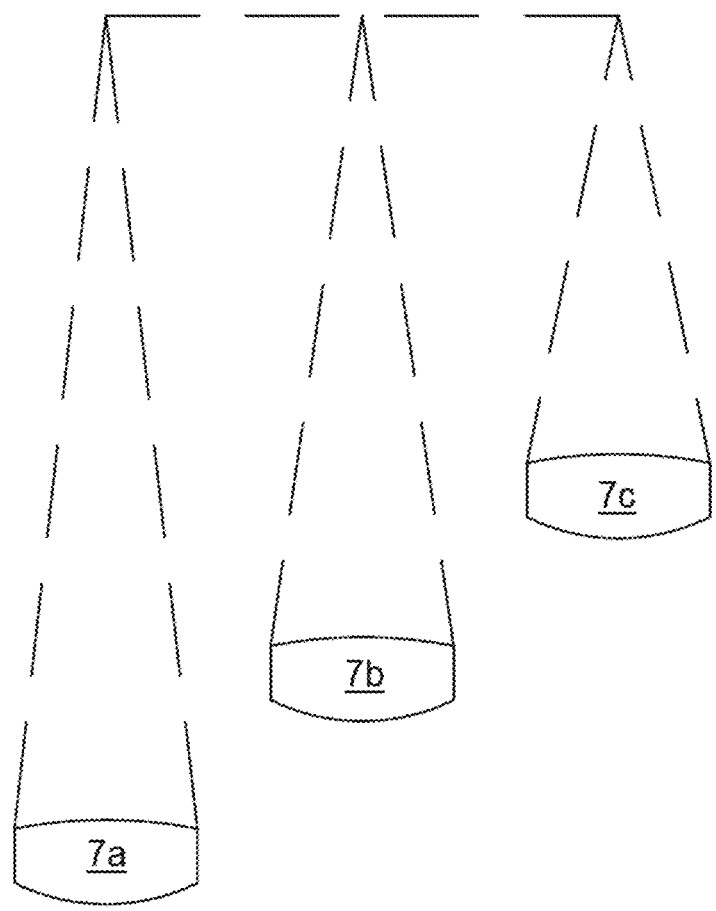
FIG. 8 illustrates various imaging lenses having different focal lengths that can be substituted for one another in an embodiment of the invention depending on the desired characteristics of the optical device. Different imaging lenses can be exchanged or introduced by means well known in the art.

While exemplary distances are provided in the above example, it is clear that the configurations described herein comprise a general formula that can be scaled up or down. For example, the optical imaging systems of the present inventions may be incorporated inside a smart phone or cellular phone, as shown in FIG. 7, or enlarged to be utilized with supersized video formats such as IMAX, etc. As shown in FIG. 7, the camera of a cellular phone 35 may comprise a front camera lens 37 which collects and redirects light, such as with a mirror or prism (not shown), to an optical system similar to those described in FIGS. 1-5. As described above, the first negative lens system 2 is positioned at a distance c.75% of its otherwise negative focal length from a second positive lens system 3, and the second negative lens system (shown in the figures as lenses 4 and 5) has a focal length approximately two times the negative focal length of the combination of lens systems 2 and 3. The third positive lens system 6 has a focal length approximately six times the negative focal length of the combination of lens systems 2 and 3. An additional supplementary lens 18 is also used to help produce the image onto focal plane 36, which may comprise a digital sensor able to record the image. Although FIG. 7 shows the optical system positioned in a horizontal direction, the optical system may be oriented in any direction in the X, Y, Z axis relative to the direction of the light entering the front camera lens 37. The light from the front camera lens may be directed to the optical system using a mirror, prism or other optical device as known in the art.

One or more lenses utilized in FIGS. 1-9 may be achromatic lenses; however, it should be understood that the lenses used in the present invention can be suitable lenses of any type.

EXAMPLE 4

The primary focusing system 20 can be made as a simplified system by making the imaging lens 7 component be a single lens, a complex lens, an aspheric lens or a microscope objective. The imaging lens 7 may be a single lens and optionally may be exchanged and substituted for other imaging lenses (7a, 7b and 7c) having different focal lengths and magnification (see FIG. 8).

Figure 9:
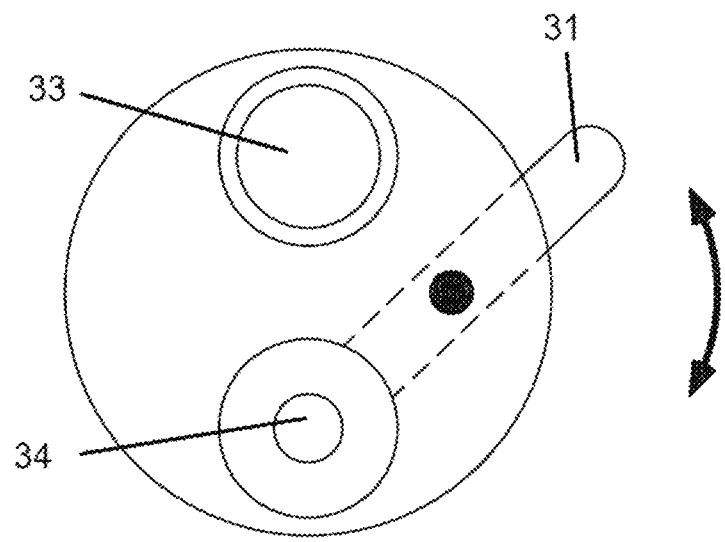
FIG. 9 shows a switch able to switch between apertures having different opening widths. For example, before entering an imaging lens, light can be selected by the switch to pass through an aperture with a full-open or wide opening (focusing with better light throughput in a non-Nelson condition) or through an aperture configured to a correct taking opening (a Nelson condition).

Additionally, the width of an aperture placed in front of the imaging lens 7 is able to be adjusted to control the amount of light entering the imaging lens 7. Controlling the width of the aperture allows the imaging system to meet its Nelson condition (i.e., the point where there is a noticeable jump in the contrast and quality of the image). Alternatively, the aperture width can be selected so as to deliberately introduce blurring of background objects or other bokeh effects. FIG. 9 illustrates an aperture switch that would be positioned in front of imaging lens 7, where the aperture switch is able to quickly switch between a first aperture 33 and a second aperture 34 having different widths. Thus, by flipping switch 31, a user would be able to quickly switch from one aperture which allows the whole image to be in focus to a another aperture which imparts an intentional bokeh effect.

Figure 10:
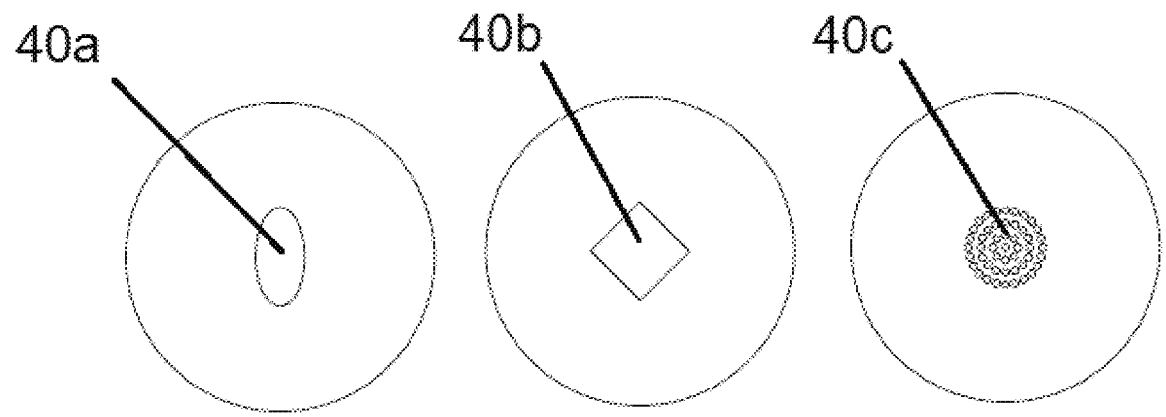
FIG. 10 shows various aperture shapes able to set different bokeh effects in an embodiment of the invention.
Figure 11:
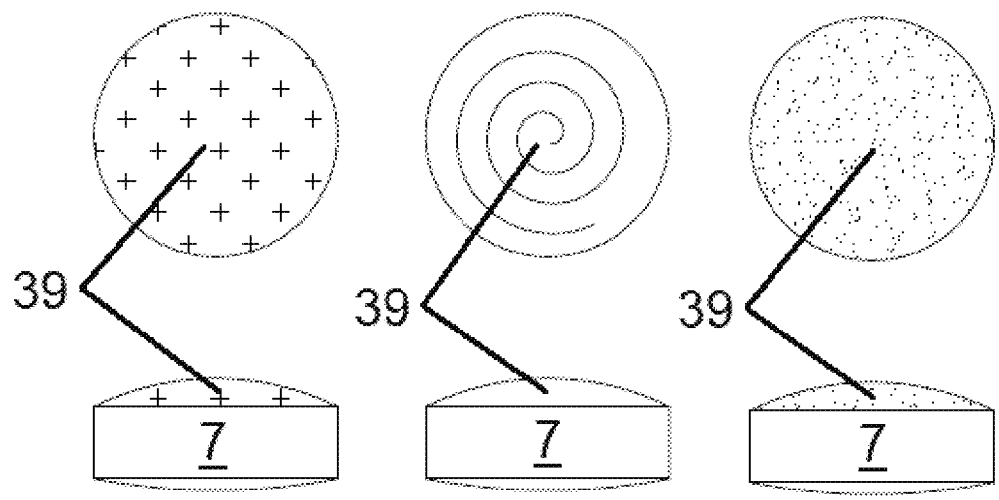
FIG. 11 shows patterns that are coated or deposited onto the imaging lens in order to provide different effects itself in an embodiment of the invention.

Additionally, as illustrated in FIG. 10, the aperture opening (40a, 40b and 40c) itself may have a selected opening shape or pattern to impart an intentional effect on the image.

Similarly, a lens coating or pattern 39 may be placed on the front surface, rear surface, or both the front and rear surface of imaging lens 7 to impart a pattern or effect on the image.

Although the embodiments exemplified herein are generally simple and economical to make, it is also understood that additional complex systems and devices can be constructed in accordance with the present invention. For example, lens systems can, in some cases, be substituted with deformable lenses, refractive and/or defractive lenses, and lenses with different gradients.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without resort to undue experimentation without affecting the scope of the invention or any specific embodiment thereof, and that such modifications or changes are intended to be encompassed within the scope of the appended claims. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

When a group of materials, compositions, components or compounds is disclosed herein, it is understood that all individual members of those groups and all subgroups thereof are disclosed separately. When a Markush group or other grouping is used herein, all individual members of the group and all combinations and subcombinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. In the disclosure and the claims, "and/or" means additionally or alternatively. Moreover, any use of a term in the singular also encompasses plural forms.

All references cited herein are hereby incorporated by reference in their entirety to the extent that there is no inconsistency with the disclosure of this specification. All headings used herein are for convenience only. All patents and publications mentioned in the specification are indicative of the levels of skill of those skilled in the art to which the invention pertains, and are herein incorporated by reference to the same extent as if each individual publication, patent or patent application was specifically and individually indicated to be incorporated by reference. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

The invention claimed is:

1. An optical system comprising:
a) an optical housing able to hold one or more optical lens systems, the optical housing having a front end able to receive light from an object and a back end able to be attached to a camera, sensor, further imaging system, or microscope device;
b) a primary focusing system positioned within the optical housing, the primary focusing system comprising a first positive lens system and a first negative lens system, wherein the first positive lens system comprises a modulated lens system, or a moveable lens system able to be moved toward and away from the first negative lens system;
c) a secondary focusing system positioned behind the primary focusing system within the optical housing, the secondary focusing system comprising a second positive lens system, a second negative lens system, and a third positive lens system,
wherein the first negative lens system has a first focal length and the second positive lens system is positioned behind the first negative lens system at a distance that is between 65% to 85% of the first negative lens system focal length, and
wherein the optical system is able to produce an image of the object and adjust focus of the image, wherein the magnification or angle of view changes by less than 5% during adjustment of the focus of the image.

2. The optical system of claim 1, wherein the optical combination of the first negative lens system and the second positive lens system results in a combined focal length that is between 20% and 30% greater than the first negative lens system focal length;
wherein the second negative lens system has a second focal length that is between 190% to 210% of the combined focal length; and
wherein the third positive lens system has a third focal length that is between 590% to 610% of the combined focal length.

3. The optical system of claim 1, wherein the magnification or angle of view changes by less than 1% during adjustment of the focus of the image.

4. The optical system of claim 1, wherein the first positive lens system comprises a modulated lens system.

5. The optical system of claim 4, wherein the modulated lens system comprises one or more deformable lens elements which are able to change focal length when the one or more deformable lens elements are deformed.

6. The optical system of claim 4, wherein the modulated lens system comprises an electrically tunable lens system having a light focusing medium, wherein applying an electric field or electric signal to the electrically tunable lens system alters the refractive index of the light focusing medium.

7. The optical system of claim 1, wherein the first positive lens system comprises a moveable lens system.

8. The optical system of claim 7, wherein the moveable lens system comprises a vibrationally controlled actuator or a voice coil actuator.

9. The optical system of claim 1, wherein the second negative lens system comprises two or more lens systems.

10. The optical system of claim 1, wherein the second negative lens system comprises a modulated lens system.

11. The optical system of claim 10, wherein the modulated lens system comprises one or more deformable lens elements which are able to change focal length when the one or more deformable lens elements are deformed.

12. The optical system of claim 10, wherein the modulated lens system comprises an electrically tunable lens system having a light focusing medium, wherein applying an electric field or electric signal to the electrically tunable lens system alters the refractive index of the light focusing medium.

13. The optical system of claim 1, wherein the second negative lens system comprises a moveable lens system.

14. The optical system of claim 13, wherein the moveable lens system comprises a vibrationally controlled actuator or a voice coil actuator.

15. The optical system of claim 1, wherein the optical system is attached to or integrated with 23 mm, 24 mm, 35 mm and 70 mm cameras.

16. A method of obtaining an image comprising the steps of:
   a) providing an optical system comprising:
      i) an optical housing able to hold one or more optical lens systems, the optical housing having a front end able to receive light from an object and a back end able to be attached to a camera, sensor, further imaging system, or microscope device;
      ii) a primary focusing system positioned within the optical housing, the primary focusing system comprising a first positive lens system and a first negative lens system;
      iii) a secondary focusing system positioned behind the primary focusing system within the optical housing, the secondary focusing system comprising a second positive lens system, a second negative lens system, and a third positive lens system,
   wherein the first positive lens system, the second negative lens system, or both comprise a modulated lens system, or a moveable lens system able to be moved toward and away from the first negative lens system,
   wherein the first negative lens system has a first focal length and the second positive lens system is positioned behind the first negative lens system at a distance that is between 65% to 85% of the first negative lens system focal length,
   wherein the optical combination of the first negative lens system and the second positive lens system results in a combined focal length that is between 20% and 30% greater than the first negative lens system focal length;
   wherein the second negative lens system has a second focal length that is between 190% to 210% of the combined focal length; and
   wherein the third positive lens system has a third focal length that is between 590% to 610% of the combined focal length; and
   b) focusing the optical system on a desired object to generate then image.

17. The method of claim 16, wherein the first positive lens system, the second negative lens system, or both comprise a moveable lens system comprising a vibrationally controlled actuator or a voice coil actuator.

18. The method of claim 17, wherein the first positive lens system, the second negative lens system, or both comprise a modulated lens system comprising one or more deformable lens elements or an electrically tunable lens system.

19. An optical system comprising:
   a) an optical housing able to hold one or more optical lens systems, the optical housing having a front end able to receive light from an object and a back end able to be attached to a camera, sensor, further imaging system, or microscope device;
   b) a primary focusing system positioned within the optical housing, the primary focusing system comprising a first positive lens system having a focal length of 50 mm (±5%) and a first negative lens system having a focal length of −20 mm (±5%);
   c) a secondary focusing system positioned behind the primary focusing system within the optical housing, the secondary focusing system comprising a second positive lens system having a focal length of 175 mm (±5%), a second negative lens system having a focal length of −50 mm (±5%), and a third positive lens system having a focal length of 150 mm (±5%),
   wherein the first positive lens system, the second negative lens system, or both comprise a modulated lens system, or a moveable lens system able to be moved toward and away from the first negative lens system, and
   wherein the second positive lens system is positioned 15 mm (±5%) behind the first negative lens system, and the optical combination of the first negative lens system and the second positive lens system results in a combined focal length of 25 mm (±5%).

20. An optical system comprising:
   a) an optical housing able to hold one or more optical lens systems, the optical housing having a front end able to receive light from an object and a back end able to be attached to a camera, sensor, further imaging system, or microscope device;
   b) a primary focusing system positioned within the optical housing, the primary focusing system comprising a first positive lens system and a first negative lens system, wherein the first positive lens system comprises a modulated lens system, or a moveable lens system able to be moved toward and away from the first negative lens system;
   c) a secondary focusing system positioned behind the primary focusing system within the optical housing, the secondary focusing system comprising a second positive lens system, a second negative lens system, and a third positive lens system,
wherein the first negative lens system has a first focal length and the second positive lens system is positioned behind the first negative lens system at a distance that is between 65% to 85% of the first negative lens system focal length,
wherein the optical combination of the first negative lens system and the second positive lens system results in a combined focal length that is between 20% and 30% greater than the first negative lens system focal length;
wherein the second negative lens system has a second focal length that is between 190% to 210% of the combined focal length; and
wherein the third positive lens system has a third focal length that is between 590% to 610% of the combined focal length.

* * * * *